United States Patent [19]

Savery

[11] Patent Number: 4,934,940
[45] Date of Patent: Jun. 19, 1990

[54] DENTAL HYGIENE INSTRUCTION DISPLAY

[76] Inventor: Winsor T. Savery, No. 1544 Sawdust Rd., The Woodlands, Tex. 77380

[21] Appl. No.: 351,217

[22] Filed: May 15, 1989

[51] Int. Cl.⁵ .............................................. A45D 44/18
[52] U.S. Cl. .................................. 434/263; 446/485; 446/395; 40/442
[58] Field of Search .............. 434/263, 238, 377, 379, 434/322, 335; 446/485, 393; 40/442, 443, 444, 541, 903

[56] References Cited

U.S. PATENT DOCUMENTS

| | | | |
|---|---|---|---|
| 2,926,487 | 3/1960 | Stone | 434/263 X |
| 3,170,265 | 2/1965 | Goldfarb | 446/73 |
| 3,783,364 | 1/1974 | Gallanis et al. | 320/2 |
| 3,998,234 | 12/1976 | Stubbmann | 434/263 |
| 4,447,212 | 5/1984 | Swift et al. | 434/335 X |
| 4,716,614 | 1/1988 | Jones et al. | 434/263 X |
| 4,752,273 | 6/1988 | Woods | 446/485 X |

Primary Examiner—Richard J. Apley
Assistant Examiner—Rachel M. Healey
Attorney, Agent, or Firm—Fleit, Jacobson, Cohn, Price, Holman & Stern

[57] ABSTRACT

A dental hygiene instructional display using a humanoid figure providing a facial expressing exhibiting representations of human teeth in adjacent upper and lower jaws. The teeth are divided into sectors and a pair of light emitting diodes of different colors are dedicated to flashingly illuminate each of the sectors, in sequence. A circuit for controlling illumination of the light emitting diodes adjustably controls both the duration of the period of brushing devoted to each sector, as well as the flash period during illumination of each cycle.

14 Claims, 3 Drawing Sheets

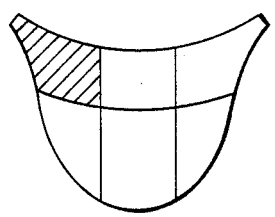 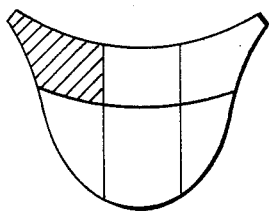 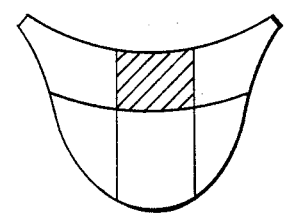 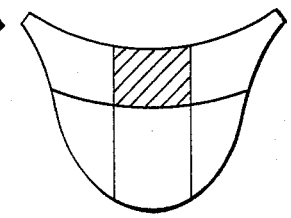
FIG. 3a  FIG. 3b  FIG. 3c  FIG. 3d
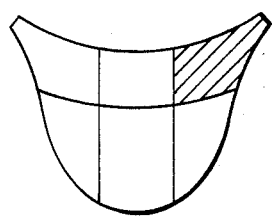 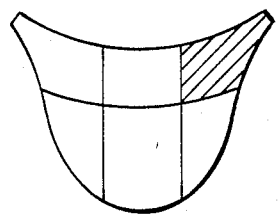 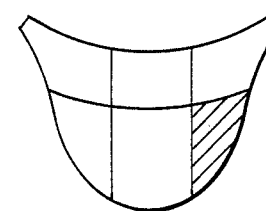 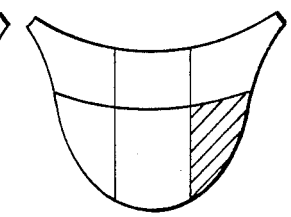
FIG. 3e  FIG. 3f  FIG. 3g  FIG. 3h
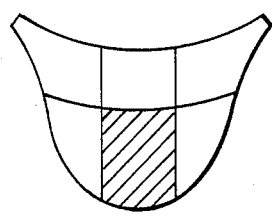 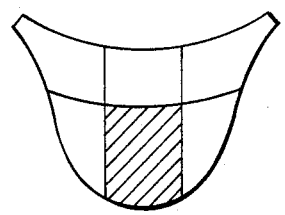 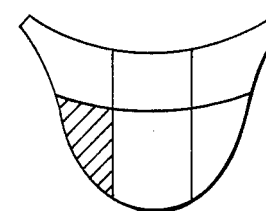 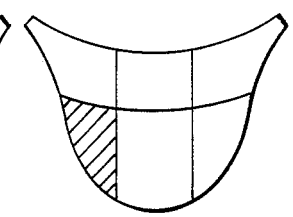
FIG. 3i  FIG. 3j  FIG. 3k  FIG. 3l

DENTAL HYGIENE INSTRUCTION DISPLAY

BACKGROUND

1. Field of Invention

This invention relates to visual displays generally and, more particularly, to timed sequentially illuminated audio-visual displays promoting dental hygiene.

2. Related Art

Stationary displays and visual devices have long been used by educators and dental hygienists in an effort to educate children about the principles of dental hygiene. There is general agreement among dental hygienists that frequent tooth brushing is an essential component of proper dental hygiene. Both the duration of the tooth brushing effort and the distribution of that effort throughout the accessible surfaces of the teeth and gums within the oral cavity are necessary. Currently available visual devices however, have tended to concentrate primarily upon the duration of the tooth brushing effort, and only secondarily upon the location where the brushing is conducted.

Displays such as wall posters illuminating correct distribution of the brushing effort are not widely distributed and are unsuitable for bathroom use. Currently available electric devices providing written instructions about brushing location have been found to be unsuitable because, at the age during which they are first taught dental hygiene, many children have not yet learned to read. Moreover, some children, although literate, must inconveniently wear eyeglasses while brushing in order to read the instructions. Furthermore, devices depending upon written instructions are unable to capture and hold the attention of children throughout the duration of the tooth brushing effort.

Other currently available devices such as those disclosed by Gallanis, U.S. Pat. No. 3,783,364, Goldfarb, U.S. Pat. No. 3,170,265 and Stone, U.S. Pat. No. 2,926,487, fail to relate timing of the tooth brushing effort to location, and thus do not emphasize distribution of the brushing effort within the oral cavity.

SUMMARY OF THE INVENTION

It is therefore, an object of the current invention to provide an improved device for promoting dental hygiene.

It is another object to provide a display indicating duration and location of tooth-brushing efforts.

It is still another object to provide a real-time display offering guidance about both duration and location of tooth brushing efforts which is readily understandable by both illiterate and sight impaired children.

It is yet another object to provide a device capable of directing tooth brushing efforts in real-time, to tooth surfaces along both the inner and outer sides of the oral cavity.

It is still yet another object to provide a real-time display prompting timed distribution of a tooth brushing effort over all accessible dental surfaces.

It is a further object to provide a real-time display offering guidance about duration and location of tooth brushing efforts sequentially for both the inside and outside tooth surfaces along upper and lower jaws of the oral cavity.

These and other objects are achieved with a dental hygiene instructional display providing a facial expression exhibiting representations of human teeth aligned in adjacent upper and lower rows of an oral cavity, with each of the rows containing a plurality of the representations. A control circuit sequential activates each of a plurality of light emitting devices dedicated to each of the representations, during successive intervals of time, thereby providing readily understandable, real-time guidance that facilitates distribution of the tooth brushing effort over tooth surfaces along both the interior and exterior of the oral cavity.

BRIEF DESCRIPTION OF THE DRAWINGS

In more complete appreciation of this invention, and many of the attendant advantages thereof, will be readily apparent as the same becomes better understood by reference to the following detailed description when considered in conjunction with the following drawings in which like reference symbols indicate the same or similar components, wherein:

FIG. 3a through 3l show the facial expression of FIG. 1 as sequentially illuminated during successive intervals of time.

DETAILED DESCRIPTION OF THE INVENTION

Figure 1:
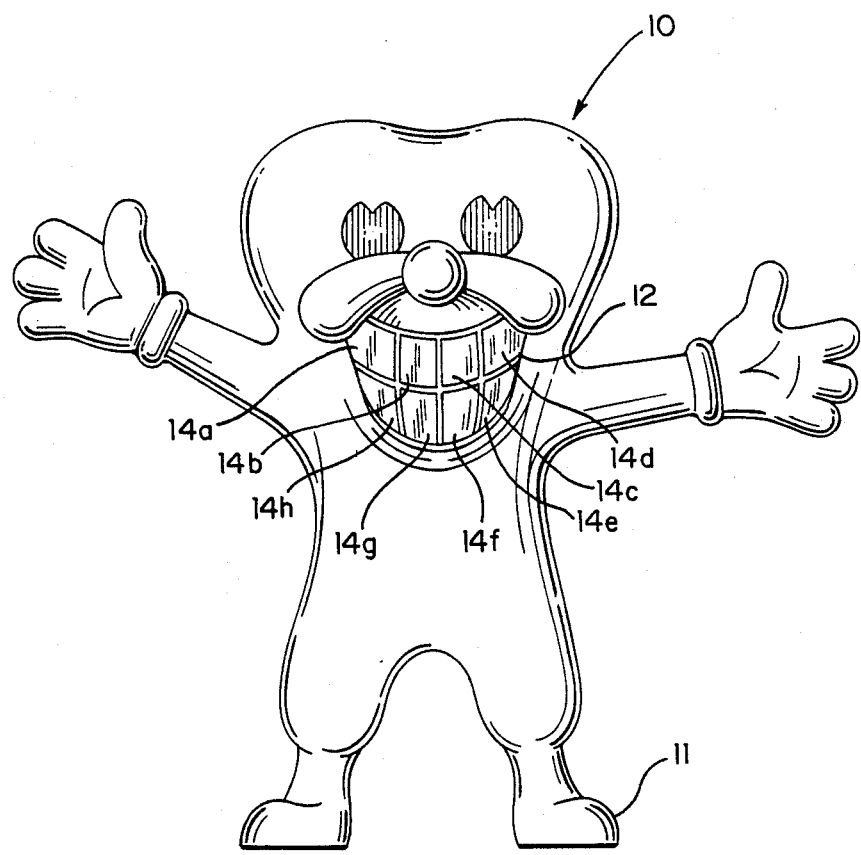
FIG. 1 is a front view of a humanoid figure displaying a facial expression exhibiting representations of human teeth.

Referring now to the figures, and in particular to FIG. 1, a character such as the humanoid statue 10 shown, stands upright upon two feet 11 and displays an oral facial expression 12 divided plurality of human teeth 14a–14h. Preferably, teeth 14a–14h are made of a white colored material; in all events, the teeth are translucent. Teeth 14a–14d form four adjoining sectors defining an upper jaw of facial expression 12 aligned with teeth 14e–14h forming four adjoining sectors defining a lower jaw of the expression.

Figure 2:
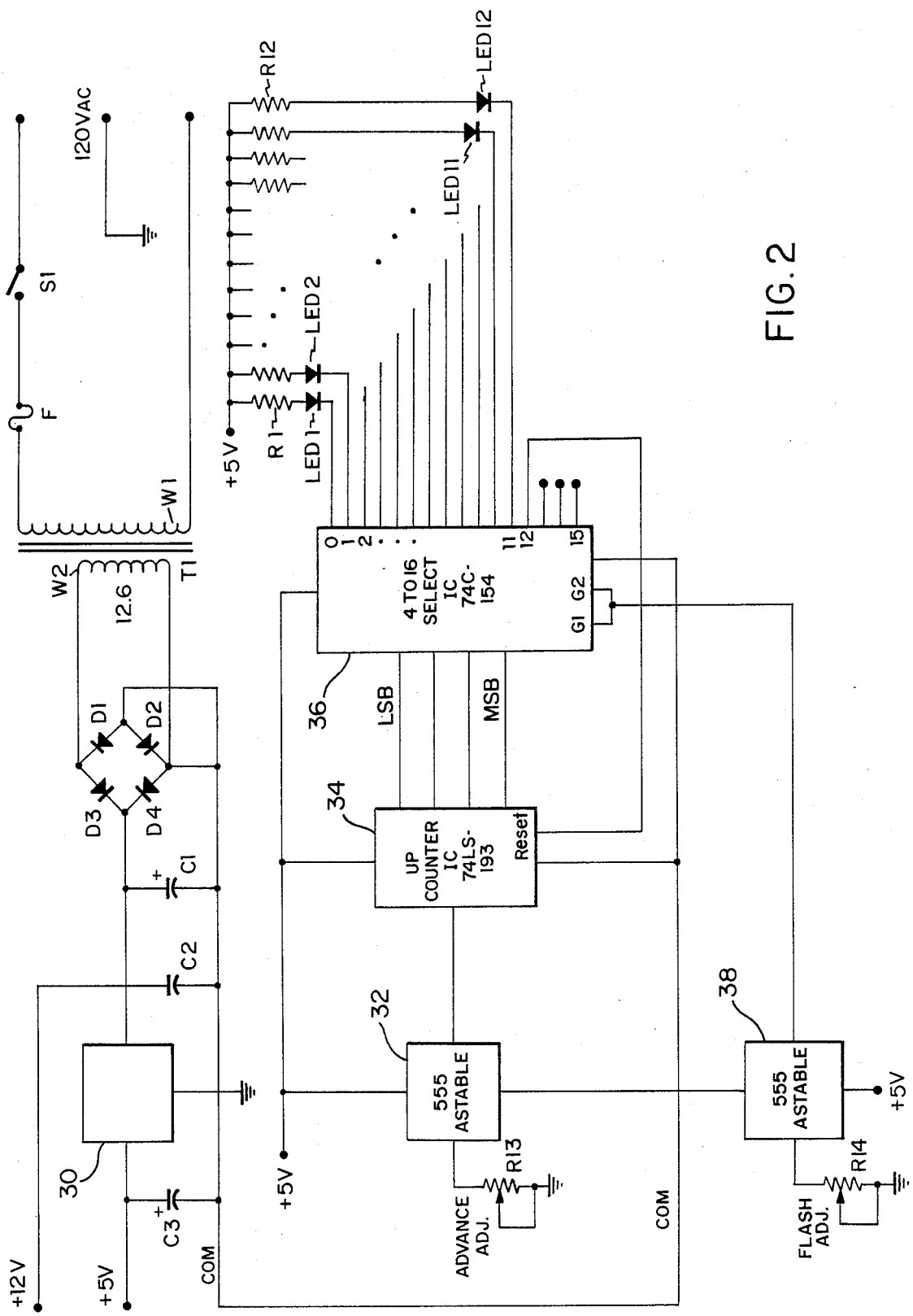
FIG. 2 is a schematic diagram of an electrical circuit for illuminating the representations displayed in FIG. 1.

Referring now to FIGS. 2 and 3 in conjunction with FIG. 1, teeth 14a–14h are each individually illuminated by pairs of different colored light emitting diodes LED-1–LED12.

The teeth 14a–14h of FIG. 1 are grouped into six distinct representations of human teeth, as shown in FIGS. 3a–3l with teeth 14b, 14c being combined into one distinct central representation in the upper jaw while teeth 14f, 14g are combined into a single distinct central representation in the lower jaw. Two light emitting diodes LED1–LED12 are dedicated, in pairs to each of the six representations shown in FIG. 3a–3l. With this arrangement one odd numbered light emitting diode and one even numbered light emitting diode may be dedicated to each of the six representations; the odd numbered light emitting diode will have one color to indicate that during its illumination, brushing is to now be performed on the interior side of the teeth while the even numbered light emitting diode will have a second and different color to indicate brushing is to be performed on the exterior of the teeth during illumination. Consequently, and as shown in FIG. 3a during a first period LED1 will illuminate tooth 14a with a flashing red color and then, as indicated in FIG. 3b LED2 will illuminate the same tooth with a flashing green color. During the third period represented by FIG. 3c, LED3 will illuminate the representation formed by combined teeth 14b, 14c with a flashing red color while during the fourth period LED4 will illuminate the same combined representation with a flashing green color, as indicated by FIG. 3d.

During the fifth and sixth periods, LED5 and LED6 will respectively successively illuminate tooth 14d with flashing red and then flashing green colors, as indicated by FIGS. 3e, 3f, respectively, while during the seventh and eighth periods LED7 and LED8 will respectively successively illuminate tooth 14e with flashing red and flashing green colors, as indicated in FIGS. 3g and 3h respectively. Then, during the 9th and 10th periods of the cycle, light emitting diodes LED9 and LED10 will successively illuminate the central representation of the lower jaw formed by teeth 14f, 14g with flashing red and then flashing green colors, as indicated by FIGS. 3i, 3j. Subsequently, during the 11th period represented by FIG. 3k, LED11 will illuminate the leftmost representation in the lower jaw defined by tooth 14h with a flashing red color, and then during the 12th and last period of the cycle, LED12 will illuminate the same representation with a flashing green color, as indicated by FIG. 3l.

As shown in FIG. 2, the circuit for driving the light emitting diode includes a power supply stage which is plug connectable to an outlet for 120 volt house current. The power supply stage includes a switch S1, a fuse F and a primary winding W1 of a step-down, iron core transformer T1. The secondary winding W2 provides about 12.6 volts across a full-wave diode bridge rectifier formed by diodes D1-D4. Capacitors C1, C2 and C3 serve to filter the rectified current provided by the diode bridge while regulator 30 provides a positive 5 volts output. A second output of about a positive 12 volts may obtained across capacitor C2.

The positive 5 volt regulated direct current is applied to power the light emitting diodes and the integrated circuit chips 32-38 forming the remainder of the network.

A first stable multivibrator 32, such as a commercially available "555" provides a train of clock pulses to an input terminal of an upcounter 34, such as a commercially available "74LS-193". Variable resistor R13 may be used to adjust the period of the clock pulses provided by multivibrator 32. Counter 34 provides a four bit output to a 4-to-16 select stage 36, such as a commercially available 74C-154 integrated circuit chip. Light emitting diodes LED1-LED12 are serially connected with corresponding load resistances R1-R12 between the 0-11 output terminals of selector stage 36 and the regulated positive via volt terminal, while output terminal 12 of selector 36 provides a reset signal to counter 34. Consequently, as the clock pulses provided by multivibrator 32 are converted into parallel four bit binary signals by counter 34, selector 36 sequentially illuminates diodes LED1-LED12.

Preferably, diodes LED1-LED12 flash during their respective periods of illuminations to thereby better hold the attention of the user. The second stable multivibrator 38, such as the commercially available "555" integrated circuit chip may be connected to terminals G1, G2 of selector 36 to regulate the flash period of the emitting diodes. The variable resistor R14 is coupled between multivibrator 36 and the reference potential to adjust the flash period.

The foregoing embodiment provides an attractor, easily useable visual display for promoting dental hygiene which both attracts and maintains the attention of children while passing and distributing their tooth brushing effort throughout the interior and exterior dental surfaces of the upper and lower jaws. The illuminated display may be activated simply by closing switch S1 and is therefore, easily useable by small children.

It may be noted that although the preferred embodiment disclosed uses twelve light emitting diodes to illuminate six adjoining representations of human teeth in twelve successive stops, with teeth 14b, 14c and teeth 14f, 14g being combined into two distinct central representation in the upper and lower jaws, respectively, other embodiments may be constructed with sixteen light sources whereby teeth 14b, 14c, 14f and 14g may be separately illuminated. Additionally, the succession in which the light emitting diodes are illuminated may also be changed as, for example, by rewiring the connections between the light emitting diodes and output terminals 0-11 of sector 36, or by interposing a twelve pole, multi-throw switch between the light emitting diodes and terminals 0-11.

I claim:

1. A dental hygiene instructional display, comprising:
   means for providing a humanoid facial expression exhibiting distinct representations of human teeth aligned in adjacent upper and lower rows with each of said rows containing a plurality of said representations;
   means dedicated for individually illuminating each of said representations; and
   means coupled to said illuminating means, for controlling said illuminating means to successively illuminate each of said representations during successive intervals of time.

2. The dental hygiene instructional display of claim 1, wherein said controlling means further comprises means for intermittently illuminating individual ones of said representations during corresponding ones of said intervals.

3. The dental hygiene instructional display of claim 1, wherein said illuminating means comprises a first plurality of visible spectrum light emitters, with each of said emitters in said first plurality being dedicated to illumination of different individual ones of said representations with a first color.

4. The dental hygiene instructional display of claim 3, wherein said illuminating means comprises a second plurality of visible spectrum light emitters, with each of said emitters in said second plurality being dedicated to illumination of different individual ones of said representations with a second color different from said first color, whereby one of said first plurality and one of said second plurality of light emitters are dedicated to illumination of each one of said representations.

5. The dental hygiene instructional display of claim 2, wherein said illuminating means comprises a first plurality of visible spectrum light emitters each emitting a first color, with each of said emitters in said first plurality being dedicated to illumination of different individual ones of said representations.

6. The dental hygiene instructional display of claim 5, wherein said illuminating means comprises a second plurality of visible spectrum light emitters each emitting a second color different from said first color, with each of said emitters in said second plurality being dedicated to different individual ones of said representations, whereby one of said first plurality and one of said second plurality of light emitters are dedicated to illumination of each one of said representations.

7. The dental hygiene instructional display of claim 4, wherein said controlling means successively activates one of said first plurality and one of said second plurality of light emitters for each of said representations.

8. The dental hygiene instructional display of claim 6, wherein said controlling means successively activates one of said first plurality and one of said second plurality of light emitters for each of said representations.

9. The dental hygiene instructional display of claim 8, wherein said illuminating means and said controlling means successively illuminate adjacent ones of said representations.

10. A dental hygiene instructional display, comprising:
   a humanoid figure having a facial expression exhibiting a plurality of adjacent sectors each serving as representations of adjoining human teeth aligned in adjacent upper and lower rows with each of said rows containing a plurality of said representations;
   means including a first plurality of light emitters dedicated to illuminating each of said sectors with a second color different from said first color, and a second plurality of light emitters dedicated to each of said sectors, for individually illuminating each of said sectors; and
   means coupled to said illuminating means, for controlling said illuminating means to successively intermittently activate each of said illuminating means of said first and second pluralities of light emitters during corresponding successive intervals of time.

11. The dental hygiene display of claim 10, further comprised of said first and second plurality of light emitters being dedicated in pairs to corresponding ones of said representations.

12. The dental hygiene display of claim 10, further comprised of said controlling means being connected to said illuminating means to, during immediately succeeding ones of said intervals, activate each one of said first plurality and one of said second plurality of light emitters dedicated to the same ones of said representations.

13. The dental hygiene display of claim 11, further comprised of said controlling means being connected to said illuminating means to activate the one of said first plurality of light emitters and the one of said second plurality of light emitters in each pair during immediately succeeding ones of said intervals.

14. A process for promoting dental hygiene instruction, comprising:
   displaying a humanoid facial expression exhibiting a plurality of adjacent sectors each serving as representations of human teeth aligned in adjacent upper and lower rows with each of said rows containing a plurality of said sectors;
   illuminating each of said sectors sequentially with a first displayed color and a second and different displayed color during successive intervals of time; and
   interrupting illumination of each of said sectors during each of said intervals to provide a flashing display.

* * * * *